US010286280B2

(12) United States Patent
Lee

(10) Patent No.: US 10,286,280 B2
(45) Date of Patent: May 14, 2019

(54) MOTIVATIONAL KINESTHETIC VIRTUAL TRAINING PROGRAM FOR MARTIAL ARTS AND FITNESS

(71) Applicant: Charles Chungyohl Lee, Austin, TX (US)

(72) Inventor: Charles Chungyohl Lee, Austin, TX (US)

( * ) Notice: Subject to any disclaimer, the term of this patent is extended or adjusted under 35 U.S.C. 154(b) by 18 days.

(21) Appl. No.: 15/619,292

(22) Filed: Jun. 9, 2017

(65) Prior Publication Data

US 2017/0291086 A1     Oct. 12, 2017

Related U.S. Application Data

(60) Provisional application No. 62/320,660, filed on Apr. 11, 2016.

(51) Int. Cl.
*A63F 13/219*     (2014.01)
*A63B 69/00*     (2006.01)
(Continued)

(52) U.S. Cl.
CPC .......... *A63B 69/004* (2013.01); *A63F 13/213* (2014.09); *A63F 13/428* (2014.09);
(Continued)

(58) Field of Classification Search
CPC ...... A63F 13/428; A63F 13/44; A63F 13/537; A63F 13/57; A63F 13/798;
(Continued)

(56) References Cited

U.S. PATENT DOCUMENTS 6,024,643 A    *   2/2000   Begis ...................... A63F 13/12
                                                                                                                           463/1
6,749,432 B2     6/2004   French et al.
(Continued)

FOREIGN PATENT DOCUMENTS

JP       2004016752 A     1/2004
WO     WO-2016/112194 A1    7/2016

*Primary Examiner* — Lawrence S Galka
(74) *Attorney, Agent, or Firm* — Craig Thompson; Thompson Patent Law; Vincent Musgrove

(57) ABSTRACT

Apparatus and associated methods relate to a computer system executing a predetermined motivational kinesthetic martial arts training program (MKMATP), the system including a preparation phase, a participation phase and a simulation phase, with a score being generated indicative of a user's move performance during the participation phase, and displaying an avatar performing moves at the user's score level during the simulation phase. The system may include sensors monitoring the user's physical space. The preparation phase may be mandatory based on an enforcement policy. The participation phase may depict various physical moves, and may generate scores indicative of the user's performance of the moves. The simulation phase may produce a computer-simulated scenario of an avatar performing the moves against an opponent, based on the user's score and randomized variables. In an illustrative example, users may learn martial arts skills and stay motivated by viewing the simulation action, while becoming physically fit.

20 Claims, 7 Drawing Sheets

(51) Int. Cl.
*G06F 3/01* (2006.01)
*A63F 13/833* (2014.01)
*A63F 13/213* (2014.01)
*G09B 19/00* (2006.01)
*A63F 13/428* (2014.01)
*A63F 13/58* (2014.01)
*A63F 13/46* (2014.01)

(52) U.S. Cl.
CPC ............ *A63F 13/833* (2014.09); *G06F 3/011* (2013.01); *G09B 19/0038* (2013.01); *A63F 13/46* (2014.09); *A63F 13/58* (2014.09); *A63F 2300/65* (2013.01); *A63F 2300/6607* (2013.01)

(58) Field of Classification Search
CPC .. A63F 2011/0065; G06F 3/011; G06F 3/017; G06F 3/04815; G09B 19/0038; A63B 69/004; A63B 69/32; A63B 2244/10; A63B 2244/102; A63B 2024/0037
See application file for complete search history.

(56) References Cited

U.S. PATENT DOCUMENTS

| | | | |
|---|---|---|---|
| 7,038,855 B2 | 5/2006 | French et al. | |
| 8,444,492 B2* | 5/2013 | Youm | A63F 13/48 463/42 |
| 9,358,456 B1* | 6/2016 | Challinor | A63F 13/04 |
| 2013/0065731 A1* | 3/2013 | Jones | A63B 69/004 482/8 |
| 2014/0099624 A1 | 4/2014 | Dohring et al. | |
| 2016/0263458 A1 | 9/2016 | Mather et al. | |

* cited by examiner

MOTIVATIONAL KINESTHETIC VIRTUAL TRAINING PROGRAM FOR MARTIAL ARTS AND FITNESS

CROSS-REFERENCE TO RELATED APPLICATIONS

This application claims the benefit of U.S. Provisional Application Ser. No. 62/320,660, titled "Methods and Systems for a Video Game," filed by Charles Chungyohl Lee on Apr. 11, 2016.

This application also claims the benefit of U.S. application Ser. No. 15/414,377, titled "Methods and Systems for Determining Motion of a Device," filed by Charles Chungyohl Lee on Jan. 24, 2017, and U.S. application Ser. No. 15/482,989, titled "Methods and Systems for Merging Real-World Media within a Virtual World," filed by Charles Chungyohl Lee on Apr. 10, 2017.

This application incorporates the entire contents of the foregoing application(s) herein by reference.

TECHNICAL FIELD

Various embodiments relate generally to educational video games and computer-aided training.

BACKGROUND

Physical exercise is activity that promotes personal fitness and overall health and wellness. People may exercise for a variety reasons, including increasing muscle strength, development of a sport or physical skill, staving off the effects of aging, general wellness, and weight loss. Studies have shown that regular physical exercise may boost the immune system and may be a key ingredient in the prevention of various diseases such as obesity. Further, physical exercise may prevent stress and depression, provide more restful sleep, and may help decrease some of the effects of childhood and adult obesity.

Kinesiology is the study of body movement. Kinesiology may address the physiological and biomechanical mechanisms of movement. Coaches having a background in kinesiology may develop and guide athletes in various sports.

SUMMARY

Apparatus and associated methods relate to a computer system executing a predetermined motivational kinesthetic martial arts training program (MKMATP), the system including a preparation phase, a participation phase and a simulation phase, with a score being generated indicative of a user's move performance during the participation phase, and displaying an avatar performing moves at the user's score level during the simulation phase. The system may include sensors monitoring the user's physical space. The preparation phase may be mandatory based on an enforcement policy. The participation phase may depict various physical moves, and may generate scores indicative of the user's performance of the moves. The simulation phase may produce a computer-simulated scenario of an avatar performing the moves against an opponent, based on the user's score and randomized variables. In an illustrative example, users may learn martial arts skills and stay motivated by viewing the simulation action, while becoming physically fit.

Various embodiments may achieve one or more advantages. For example, the MKMATP may include a video game methodology with all the excitement of a traditional video game, while teaching more complex physical or academic concepts/skills. In some embodiments, the MKMATP may teach a skill while keeping a student user motivated and entertained. Various embodiments may be sophisticated in terms of what they are able to kinesthetically teach a user. In some examples, the MKMATP may be a game with a game avatar that reacts to user motions. In an illustrative example, a virtual coach, teacher or master may step the user through training programs. In some embodiments, self-defense skills may be taught. Such skills may increase muscle strength and cardiovascular fitness. Various embodiments may be sophisticated in terms of what they academically teach a user.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, a use case scenario is briefly introduced with reference to FIG. 1. Second, with reference to FIGS. 2 and 3, the discussion turns to exemplary block diagrams that illustrate the main functionality modules of an exemplary motivational kinesthetic martial arts training program (MKMATP). Finally, with reference to FIGS. 4, 5, 6 and 7, flowcharts are presented to illustrate exemplary functionality.

Figure 1:
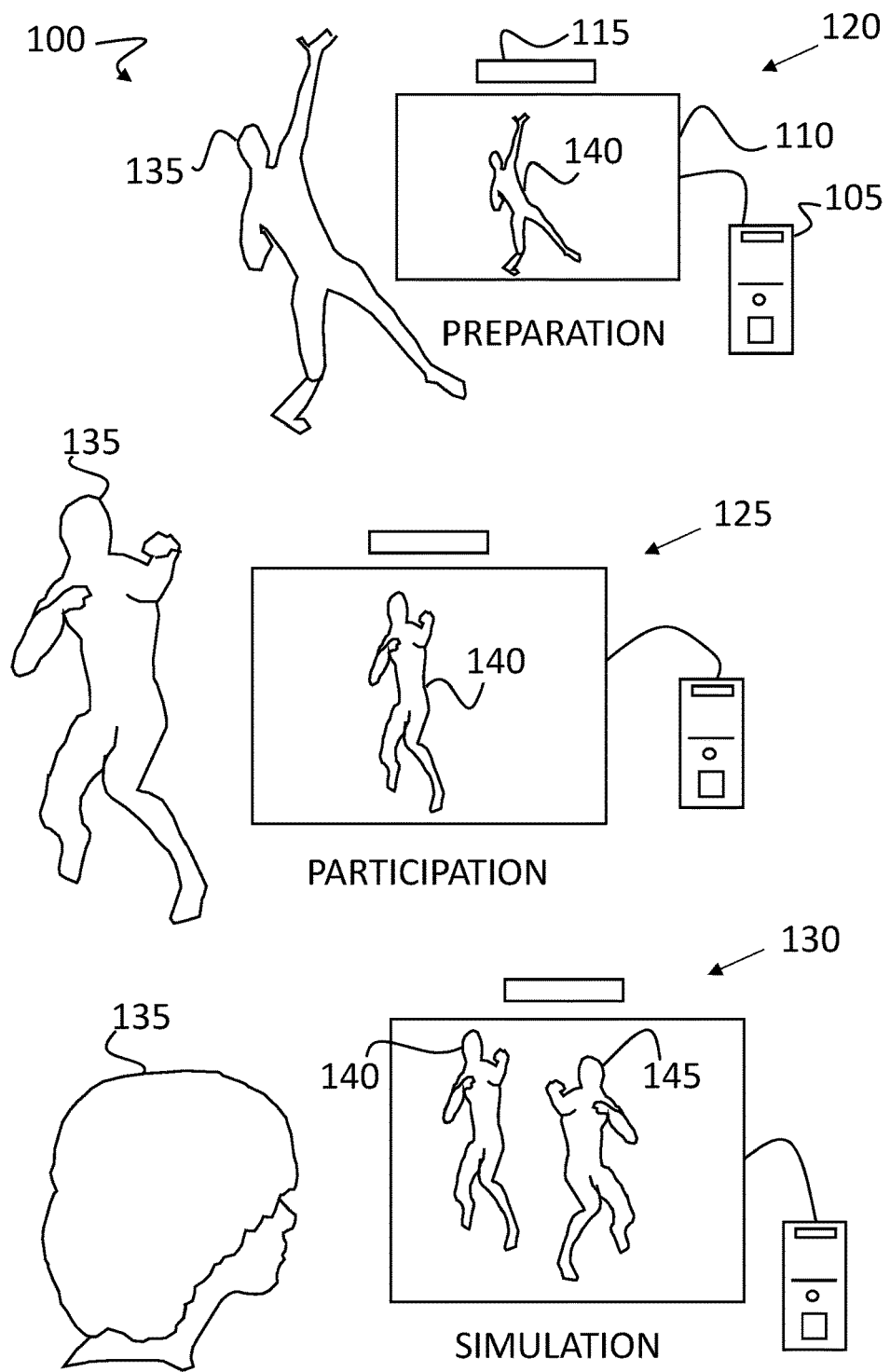
FIG. 1 depicts an elevation view of an exemplary MKMATP in a use case scenario.

FIG. 1 depicts a perspective view of an exemplary MKMATP in a use case scenario. A MKMATP in a use case scenario 100 includes a computer system 105. The computer system 105 is coupled to a video screen 110. As depicted, the computer system 105 is coupled to a motion detector 115. In some examples, the motion detector 105 may not be included in the MKMATP system. In the depicted computer setup, the computer system 105 executes pre-programmed MKMATP program code. The computer system 105 controls the video screen 110, which generates the video images associated with the MKMATP program. The computer system 105 receives motion input from the motion detector 115. In some embodiments, the motion detector 115 may employ IR detection. In some examples, the motion detector 115 may employ a camera. In some examples, the motion detector 115 may employ ultrasound.

The MKMATP in the use case scenario 100 first executes a preparation phase 120. For example, a virtual instructor may guide a user 135 through various warm-up and long-term teaching exercises. The warm-up exercises may include vigorous muscle movements to increase the user's heart rate, warm up the user's muscles, or exemplify various stretches. In some examples, the MKMATP may include various moves that may be scheduled for execution in a later phase or as part of the preparation phase 120. In an illustrative example, more sophisticated moves may be phased-in each time the preparation phase 120 is executed, which may advantageously increase a user's long-term skill level gradually. In some examples, the MKMATP may detect a lack of physical user movement and may request that the user execute the warm-up moves. Accordingly, the preparation phase may enforce user warm-up in order to continue.

The MKMATP in the use case scenario 100 next executes a participation phase 125. For example, a virtual space presented to a user may be associated with the participation phase 125, such that the user 135 may be presented with skills and actions, for example, that may be performed by the user 135. During the participation phase 125, an in-game character 140 associated with the user 135 may perform actions corresponding to the real-world actions performed by the user 135. The in-game character 140 may be controlled by the associated user 135. Within the participation phase 125, the MKMATP may calculate a user's 135 personal movement score based on the user's 135 performance of the presented skills and actions. Accordingly, the user 135 may be defining the in-game character's 140 abilities and skills by the personal movement score in the participation phase 125.

A user controlled element(s) may move through and interact with the virtual space and its elements (e.g., opponent characters in the virtual space, other objects in the virtual space). The user 135 may perform actions to control the in-game character 140 responsive to the user's actions. For example, the user 135 may perform actions to indicate that the in-game character 140 is to perform a series of karate moves (e.g., punch, kick, roll, block).

In some examples, the instance of the game during the participation phase 125 may be a classroom, dojo, or a field, such that an in-game instructor may deliver instructions to the user 135. Further, the user 135 may perform the instructed skills in response to receiving the instructions.

In some embodiments, the user's in-game character 140 may be referred to as an "avatar." In some examples, the user's in-game character 140 may be referred to as a "user character." A user character may refer to an object, or group of objects present in the virtual space that represent an individual user.

The MKMATP in a use case scenario 100 next executes a simulation phase 130. During the simulation phase 130, a user's 135 in-game character 140, a challenger in-game character 145 and/or objects may interact with each other based on the user's 135 performance of the skills. Further, basing the interactions (e.g., fights) with the user's 135 performance of the skills, may motivate the user 135 to learn these and future skills better. Additionally, the in-game character 140 may perform actions based on the proficiency of the user's 135 actions to perform a series of instructed skills. For example, the user 135 may be requested to perform a series of blocks, kicks, and punches. The in-game character 140 may then perform simulated actions based on the user 135 proficiency of the performed skills. Also, the virtual space presented to the user in the simulation phase 130 may be associated with a simulation based upon the user's 135 performance of the skills during the participation phase 125 and randomized variables.

In some examples, the simulation phase 130 may be a motivational feedback. The user 135 may observe the in-game character 140 performing better as the user 135 learns more.

In some embodiments, the simulation phase 130 may execute autonomously without user 135 input. In various examples, the simulation phase 130 may respond to various user input. In some examples, the simulation phase 130 may respond to user requests to view the simulation/animation at various viewing perspectives and/or various viewing angles.

In some embodiments, the participation phase 125 and the simulation phase 130 may come in rapid succession and may be repeated for as long as the user 135 wishes. The rapid succession between the participation phase 125 and the simulation phase 130 may advantageously keep the user's 135 heart rate up. In some embodiments, once the preparation phase 120 is complete, the participation phase 125 and the simulation phase 130 may continue to execute without coming back to the preparation phase 120. In some examples, a predetermined time threshold may be defined such that when exceeded, the preparation phase 120 may be re-enforced. In an illustrative example, the user 135 may keep their motivation as the participation phase 125 is quickly succeeded by the simulation phase 130, where a very short and intense simulation may be presented, and where the simulation phase 130 is also quickly succeeded by another participation phase 125.

Figure 2:
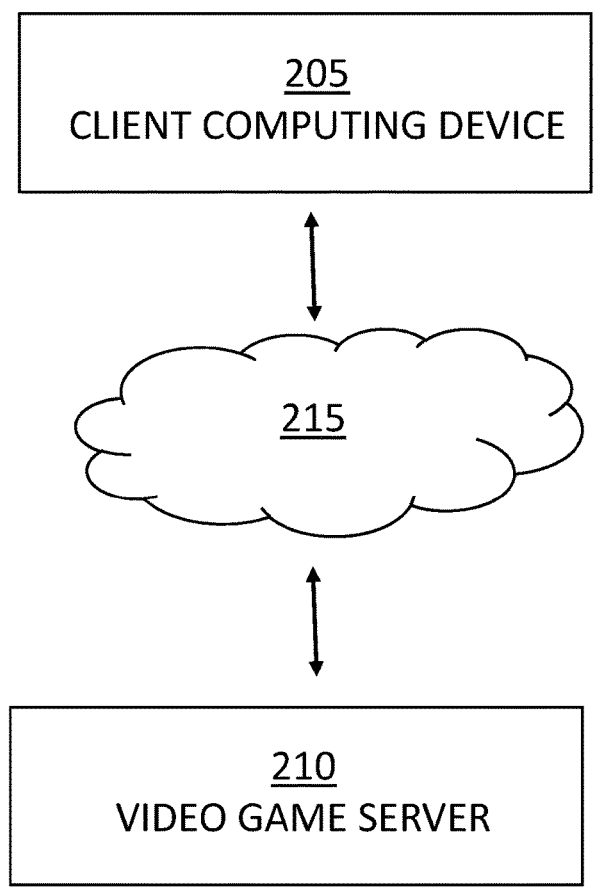
FIG. 2 depicts an exemplary computer topology for a motivational kinesthetic martial arts training program (MKMATP).

FIG. 2 depicts an exemplary computer topology for a motivational kinesthetic martial arts training program (MKMATP). A computer topology 200 includes a client computing device 205 and a video game server 210. The client computing device 205 and the video game server 210 may communicate to each other over a network 215.

In some examples, the network 215 may be a wired or a wireless network such as the Internet, an intranet, a LAN, a WAN, a cellular network, a near field communication network (NFC), or other network. In some embodiments, the network 215 may be a combination of multiple wired or wireless networks.

In an illustrative example, the client computing device 205 may be a desktop computer, a laptop computer, a handheld computer, a tablet computing platform, a mobile phone, a gaming console, and/or other computing platform. Further, the client computing device 205 may include a user interface, a communication device, and a memory device.

In some embodiments, the user interface may be, for example, a touch screen, a physical keyboard, a mouse, a camera, a video camera, a controller, a joystick, and/or a microphone, such that the user interface may be configured to receive inputs associated with a user's real-world actions. In some embodiments, in-game actions may be performed in response to a user's employment of the user interface. Further, the in-game actions may be associated with a score performing a skill, controlling an in-game character, and/or changing a view of virtual space.

In various examples, a communication device may be configured to receive data generated by the client computing device 205 via the user interface, and to transmit data generated via the user interface to other elements over the network 215.

In some embodiments, the video game server 210 may be configured to execute an instance of a video game on the client computing device 205. The instance of the game may be associated with data that is presented to the user of the client computing device 205 playing the game. In response to receiving action requests for in-game actions input by users, the video game server 210 may be configured to implement the in-game actions during the simulation phase.

Figure 3:
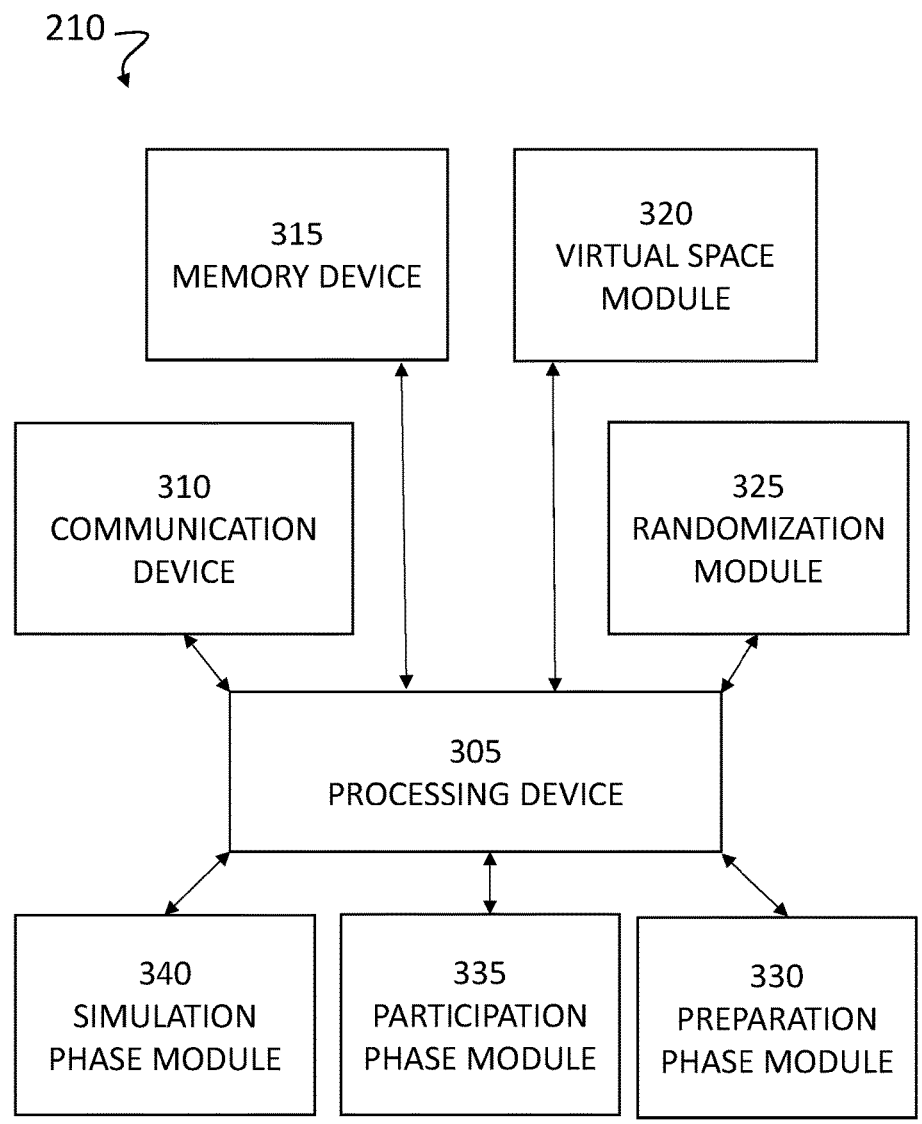
FIG. 3 depicts a block diagram of the video game server of an exemplary MKMATP.

FIG. 3 depicts a block diagram of the video game server of an exemplary MKMATP. The video game server 210 includes a processing device 305. In some examples, the processing device 305 may be a hardware processing device including memory (e.g., read only memory (ROM), random access memory (RAM)), which may store processor-executable instructions and one or more processors that execute the processor-executable instructions. In some embodiments where the processing device 305 includes two or more processors, the processors may operate in a parallel or distributed manner. The processing device 305 may execute an operating system of the video game server 210 or software associated with other elements of the video game server 210.

The processing device 305 couples to a communication device 310. In an illustrative example, the communication device 310 may be a device that allows the video game server 210 to communicate with another device over the network 215. The communication device 310 may include one or more wireless transceivers for performing wireless communication and/or one or more communication ports for performing wired communication.

The processing device 305 couples to a memory device 315. In some examples, the memory device 315 may be a device that stores data generated or received by the video game server 210. The memory device 315 may include a hard disc drive, an optical disc drive, and/or a flash memory drive.

The processing device 305 couples to a virtual space module 320. In some embodiments, the virtual space module 320 may be a hardware processing device configured to implement an instance of virtual space on the client computing device 205. For example, the instance of virtual space may be associated with a tutorial and/or action sequences for subsequent phases. In some embodiments, the tutorial sequence may include an instructor performing, demonstrating, discussing skills and/or actions that a user may perform.

The processing device 305 couples to a randomization module 325. In some examples, the randomization module 325 may be a hardware processing device configured to adjust, modify, revise and/or amend the user's participation score to generate a randomized performance score. The randomization module 325 may adjust the user's participation score based on a variety of factors, such as the skill level of the user, time spent learning a skill, number of times the user has performed a specific participation stage and/or the stage associated with a game. In some examples, lower stages may be adjusted more widely than higher stages. In some embodiments, the randomization module 325 may "handicap" a more skilled-user versus a less skilled user, which may advantageously avoid endless one-sided victories. Accordingly, rank amateur users may still have fun playing with very skilled professionals.

In some embodiments, the randomization module 325 may adjust the user's participation score by changing an action within a series of actions that the user incorrectly performed, to an action correctly performed, or vice versa. In some embodiments, the randomization module 325 may not adjust the user's participation score. The randomization module 325 may dynamically change the user's performance score, such that each time the user receives a given performance score, the randomized performance score may be different.

The processing device 305 couples to a preparation phase module 330. In some examples, the preparation phase module 330 may be a hardware processing device configured to implement a virtual space to prepare a user of the client computing device 205. The preparation phase may be initiated in response to user initiation of the application. For example, the avatar may perform activities that the user may mimic in order to prepare themselves.

In an illustrative example, a preparation type of activity may be enforced by the MKMATP program to be separate from, and earlier than, the participation phase. Warm-up activities may immediately prepare a user's body/mind for vigorous physical/academic activity, then may be followed by preparation phase activities that, over a long term (days or even months), may slowly introduce the user's body or mind to long-term preparation. In some examples, the preparation activities may be gradually introduced to the user, to provide safe and effective training. Further, in some embodiments, applications may stop immediately if the user decides to stop game play.

The processing device 305 couples to a participation phase module 335. In some examples, the participation phase module 335 may be a hardware processing device configured to implement a virtual space to teach a user of the client computing device 205 a skill. The participation phase may be initiated in response to an avatar performing actions in the virtual space. For example, the avatar may perform actions that the user may mimic or employ to learn a skill. The actions may be associated with a sport, such as karate.

In some embodiments, the participation phase module 335 may be configured to determine if the user proficiently performed the real-world actions corresponding to the actions presented by the in-game instructor. For example, the participation phase module 335 may be configured to determine which actions of a series of actions the user correctly performed at a correct timing sequence via motion control software, voice recognition software, or the user entering data, indicating which of the series of actions that the user correctly performed. The participation phase module 335 may determine a participation score for the user in response to the user performance of a series of actions. For example, if the user correctly performed six actions out of ten, the participation phase module 335 may determine that the user's participation score is six. Accordingly, the participation score may be directly linked to the user's performance of the actions.

The processing device 305 couples to a simulation phase module 340. In some embodiments, the simulation phase module 340 may be a hardware processing device configured to implement a simulation within the virtual space. The simulation may be presented to the user on the client computing device 205 after the user has performed the participation phase. During the simulation, the user may be prevented from controlling an in-game character. The simulation may include actions intended for an in-game character during a simulation. The actions may include actions and/or skills that may have been presented to the user during the participation phase. In some examples, actions executed by the in-game character may include fictional skills that may be unrealistic to be performed by a user.

In some examples, the simulation may be based on an activity associated with the participation phase, the participation score, and/or the randomized participation score. For example, if the participation phase instructed the user to perform a series of karate moves, the simulation phase may include a fight series where an in-game user character may simulate a fight scene with in-game non-user characters. In an illustrative academically-orientated example game, the participation phase may instruct a user to perform a series of mathematical operations to determine weight load limits for a bridge. In such a scenario, the simulation phase may include in-game elements (e.g., cars, trucks) crossing an in-game bridge.

In an illustrative example, the in-game character in the simulation may perform movements, actions, and skills that were presented to the user during the participation phase. For example, if the participation phase instructed the user to perform a series of actions (e.g., kicks, blocks, punches), the in-game character may perform these actions during the simulation. Further, the in-game character may perform actions during the simulation that the user correctly performed during the participation phase. The in-game character may not perform actions during the simulation that the user incorrectly performed during the participation phase. For example, if during the participation phase the user correctly performed a series of punches and kicks but incorrectly performed a block, then the in-game character within the simulation may perform a series of punches and kicks but may miss a block during a fight sequence. Accordingly, the simulation may be based on the skills presented to the user during the participation phase. In some embodiments, the simulation may present the user with a simulation score that may determine various rewards (e.g., points, lives, reward sounds).

The in-game character may also perform additional skills that were not presented to the user during the participation stage. The additional skills may be later presented to the user during a participation phase, or may be too complex or unrealistic to present to the user during a participation phase. Accordingly, users may be presented with upcoming skills that they will learn in the simulation phase. This may motivate the user to become more proficient at the presented skills, as well as the upcoming skills.

In some embodiments, the randomized participation score may adjust the probability of whether the in-game character succeeds in performing a skill during a simulation that the user performed (correctly or incorrectly) during the participation phase. The randomized participation score may also affect the probabilities of whether the in-game character performs (correctly or incorrectly) the additional skills during the simulation.

In various embodiments, the in-game character may be given a simulation score based on the participation score and/or the randomized participation score in response to the in-game character performing the simulation. The simulation score may be based on adjusted variables. Further, users of different skill levels may be able to compete against each other in a competitive manner.

In an illustrative example, while playing the video game, users may be given two scoring metrics, a first being the participation score and a second being the simulation score. The participation score may be directly based on the user's actions, and the simulation score may be based on the user's actions and randomized variables.

Figure 4:
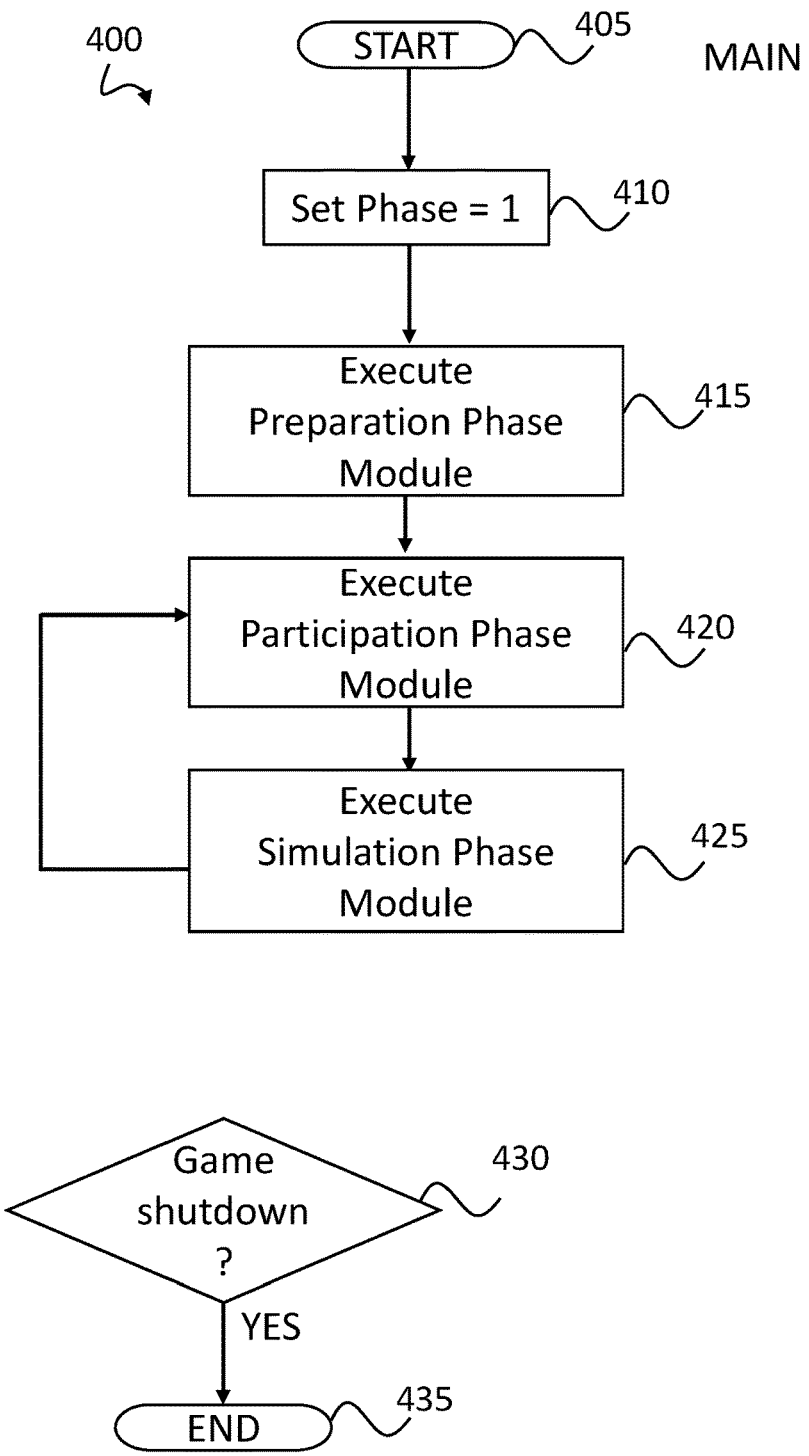
FIG. 4 depicts a flowchart of a main routine of an exemplary MKMATP.

FIG. 4 depicts a flowchart of a main routine of an exemplary MKMATP. A main routine flowchart 400 for an exemplary MKMATP begins at a START 405. The process begins by initializing the phase variable to one 410, correlating to the first phase, or the preparation phase. The process then executes a preparation phase module 415. The process then executes a participation phase module 420. The process then executes a simulation phase module 425. The program execution goes back to the execution of the participation phase module 420. If at any time the user requests the game to shut down 430, then the program ends 435.

Figure 5:
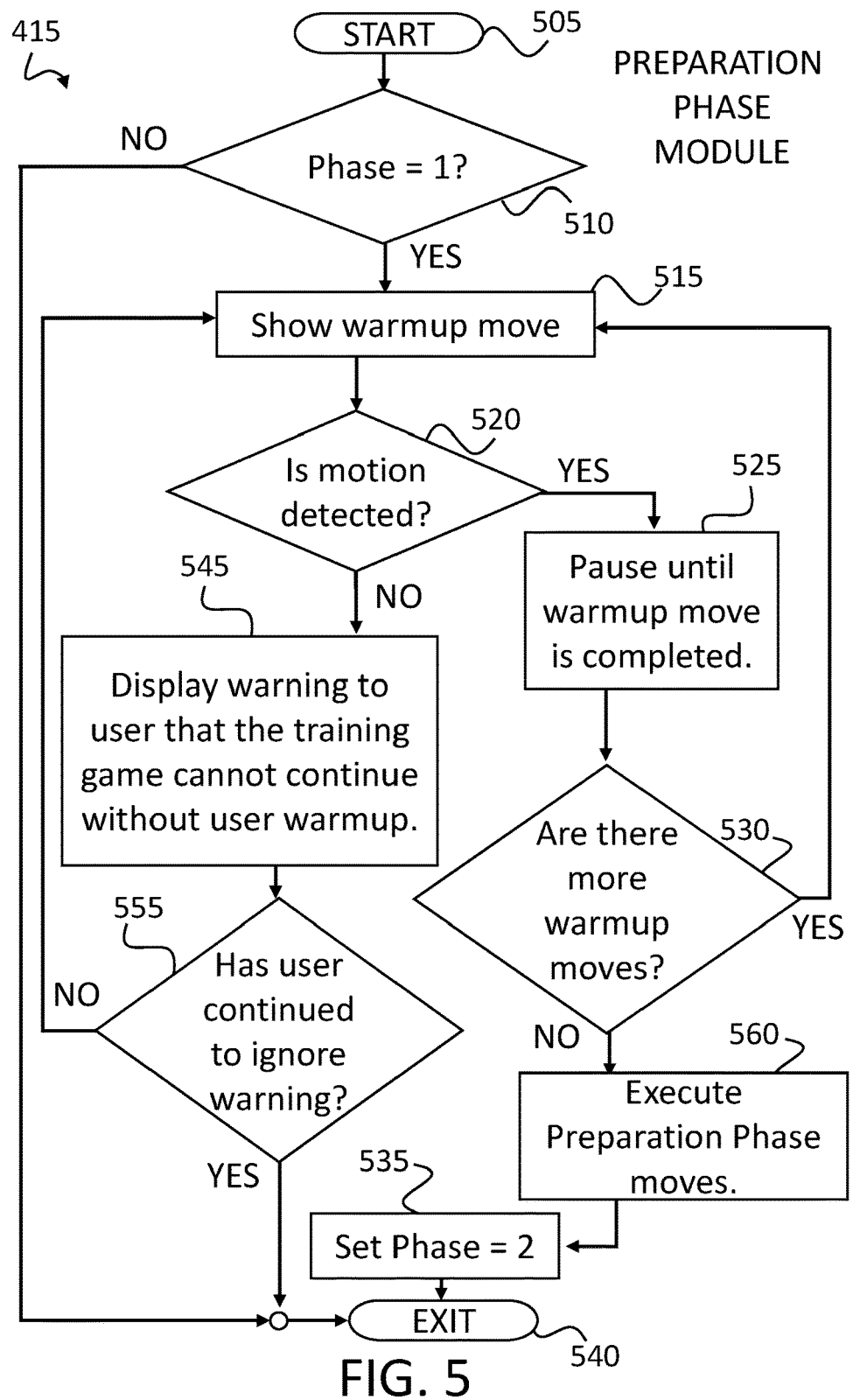
FIG. 5 depicts a flowchart of a preparation phase of an exemplary MKMATP.

FIG. 5 depicts a flowchart of a preparation phase of an exemplary MKMATP. The preparation phase module 415 flowchart begins at a START 505. The process begins by checking if the phase variable is one, indicating a preparation phase 510. If the phase variable is not equal to one, then the module is exited 540. If the phase variable is equal to one, then the process shows a warm-up move 515 on the display. The process then asks if motion is detected 520.

If motion is detected 520, then the process will pause until the user completes a warm-up 525. The process then asks if there are any more warm-up moves 530. If there are more warm-up moves, then the process proceeds to showing the next warm-up move 515. If there are no more warm-up moves, then preparation phase moves are executed 560 and the phase variable is set to two 535. The process is then exited 540.

If motion is not detected 520, then the process will display a warning to the user that the training game may not continue without user warm-up 545. The process then determines if the user has continued to ignore the warning 555. If the user has heeded the warning by moving and warming up, then the process shows the warm-up move 515. If the user has continued to ignore the warning, the process is exited 540.

Figure 6:
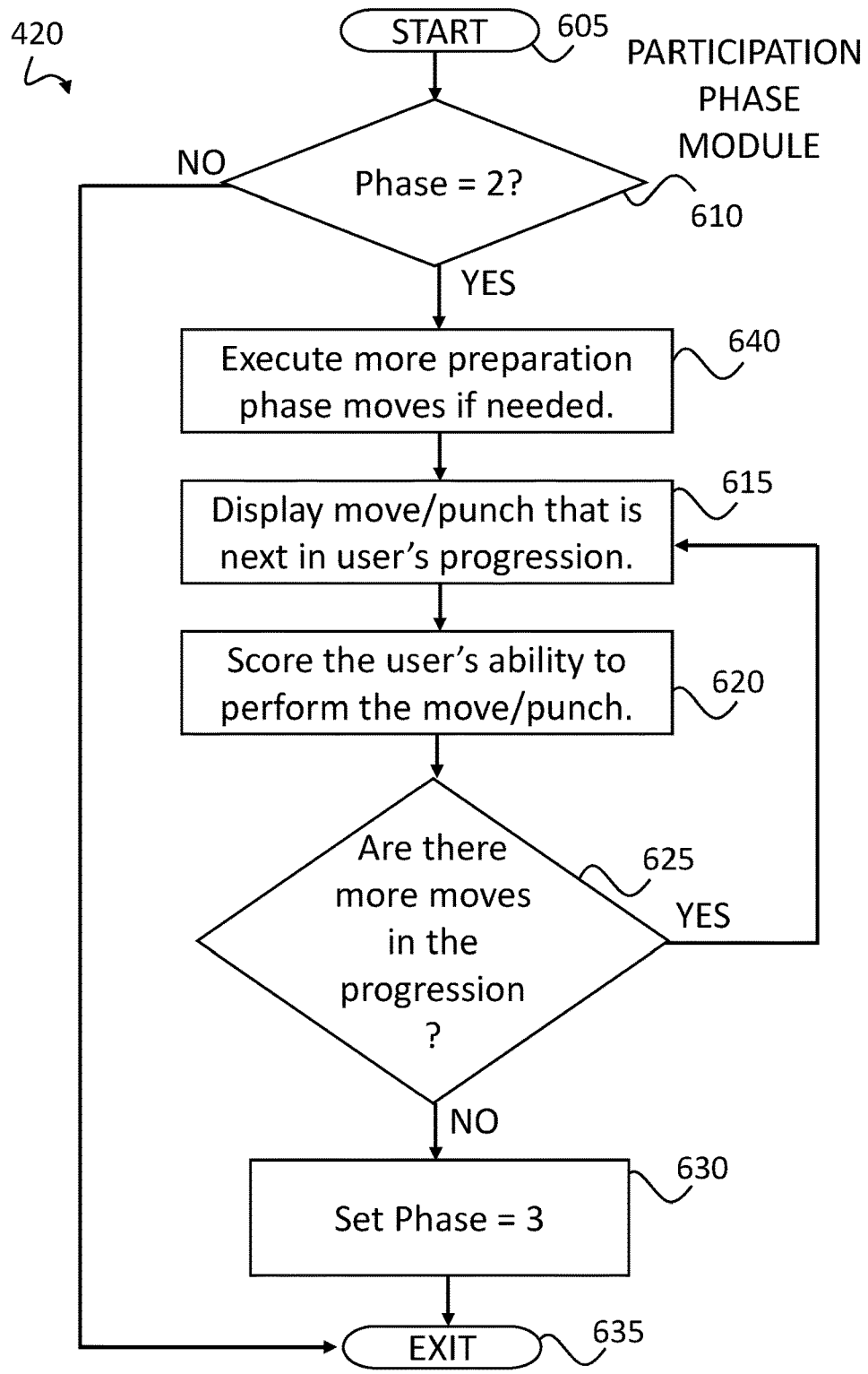
FIG. 6 depicts a flowchart of a participation phase of an exemplary MKMATP.

FIG. 6 depicts a flowchart of a participation phase of an exemplary MKMATP. The participation phase module 420 flowchart begins at a START 605. The process begins by checking if the phase variable is two, indicating a participation phase 610. If the phase variable is not equal to two, then the module is exited 635. If the phase variable is equal to two, then the process executes preparation phase moves if needed 640. The process then displays a move or a punch that is the next action in a user's progression 615. The process then scores the user's ability to perform the move or punch 620. The process then asks if there are more moves to a progression 625. If there are more moves in the progression, then the process moves to displaying the next move or punch in the user's progression 615. If there are no more moves in the progression then the phase variable is set to three 630 and the process is exited 635.

Figure 7:
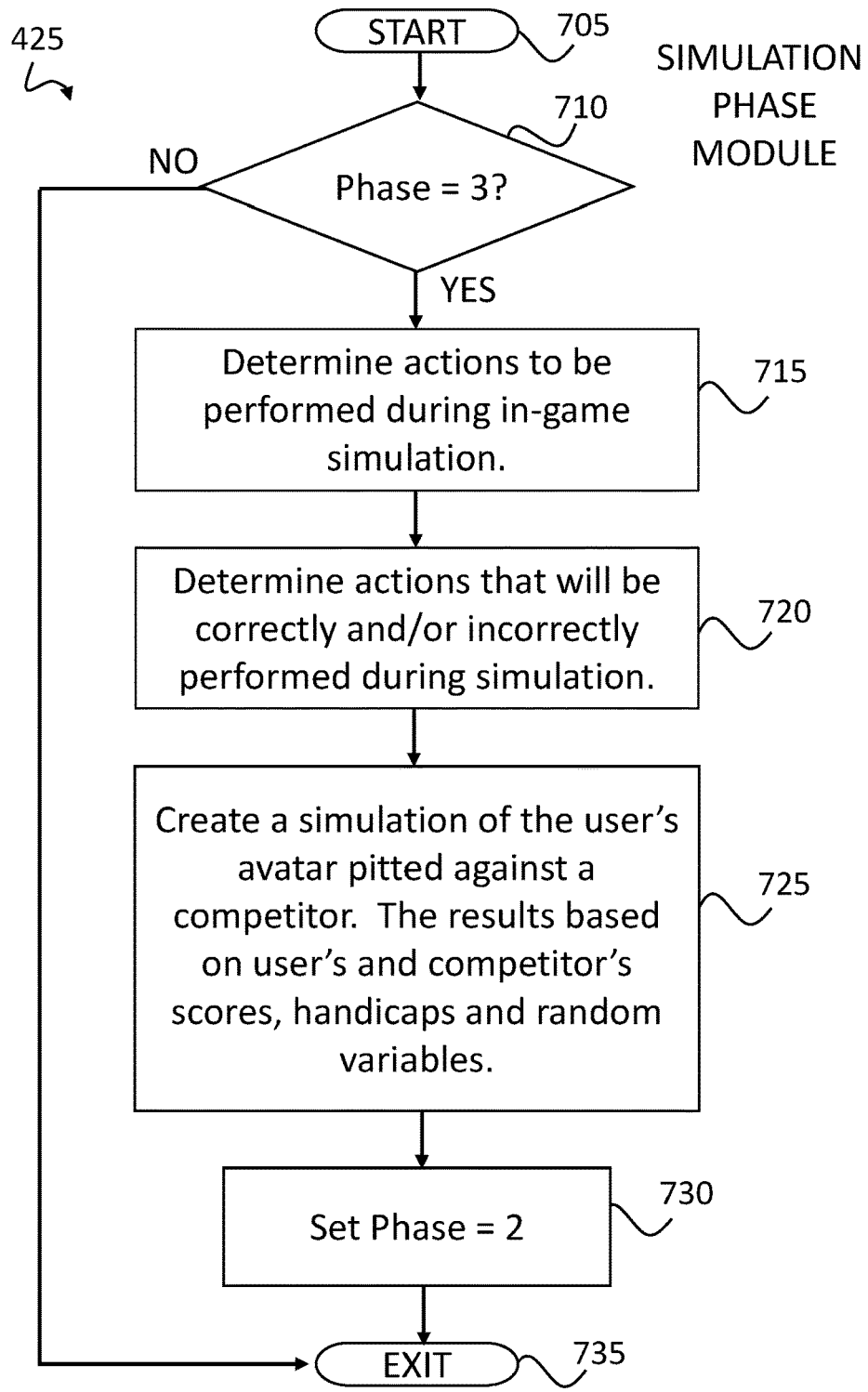
FIG. 7 depicts a flowchart of a simulation phase of an exemplary MKMATP.

FIG. 7 depicts a flowchart of a simulation phase of an exemplary MKMATP. The simulation phase module 425 flowchart begins at a START 705. The process begins by checking if the phase variable is three, indicating a simulation phase 710. If the phase variable is not equal to three then the module is exited 735. If the phase variable is equal to three, then the process determines the actions to be performed during an in-game simulation 715. Next, the process determines the actions that will be correctly and/or incorrectly performed during a simulation 720. Next, the process creates a simulation of the user's avatar pitted against a competitor. The results of the competition are based on the user's and the competitor's scores, handicaps and random variables 725. Next, the process sets the phase variable to two 730. The process is then exited 735.

Although various embodiments have been described with reference to the figures, other embodiments are possible. For example, the MKMATP may display on-screen moves that may advantageously enhance and/or improve personal coordination. In some embodiments, the MKMATP may be displayed on virtual reality audio/video headsets. In various examples, the MKMATP may provide tight coupling between the user and the user's virtual avatar. In an illustrative example, the MKMATP may be a virtual physical exercise motivational trainer. Some embodiments may be configured as systems and methods for a video game. In some embodiments, the video game may be substantially educational and engaging. The MKMATP may combine the fun and excitement of a fast-action 3D video game with the slower teaching of a complex and time-consuming subject.

In an illustrative example, a user's ratio of warm-up time to participation time may be substantially low in cases where the user starts a game in the morning and plays the game for four hours straight. In such examples, the warm-up time to participation time may be ¼ that of a user who warms up then plays for one hour. In such examples, the MKMATP may mix in some of the preparation phase teaching into the participation phase. This implementation may ensure that a user receives adequate preparation phase practice, regardless of the ratio of warm-up time to participation time. The MKMATP may be teaching new moves that may involve substantial user balance/coordination, or may teach academic concepts that may be very obtuse to a beginner (e.g., integration, differentiation). In some embodiments, such difficult skills may be presented gradually to a beginner (for example, in the participation phase) to increase safety and success rate. Further, in some embodiments, preparation-phase introductory teaching (as part of the warm-up or mixed into the participation phase), may be taught days or even months in advance of the performance in the participation phase. This approach may advantageously teach difficult moves or concepts in a safe and self-confident manner.

In various examples, the MKMATP may receive very simple and gradual user inputs, which may result in very impressive and more skilled avatar reaction. Accordingly, the MKMATP may teach complex skills while maintaining excitement. In some examples, and in this way, the MKMATP may instantly make a novice look like an expert. This may allow teaching in a very gradual and basic fashion, while advantageously providing the entertaining illusion of achieving superhuman feats.

Various Exemplary Embodiments

In some embodiments, the MKMATP may teach martial arts. Those skilled in the martial arts may closely direct application content designers for the game/application, such that the taught moves may be both accurate and provided to the student at an appropriate time during their learning timeline. Further, the length of the various phases may be arranged such that a preparation phase may be at the end of a physical warm-up. Succeeding the preparation may follow three participation phases, teaching three small skills and scoring the performance. Succeeding the participation phases may follow one simulation phase for user excitement, based loosely upon participation score and other factors.

In some embodiments, the MKMATP may teach music and arts. Those skilled in music or other arts may closely direct application content designers for the game/application, such that the taught skills may be both accurate and provided to the student at an appropriate time during their learning timeline.

In some embodiments, the MKMATP may teach dance. Those skilled in various dance arts may closely direct application content designers for the game/application, such that the taught moves may be both accurate and provided to the student at an appropriate time during their learning timeline.

In some embodiments, the MKMATP may teach academia. Those skilled in academic education may closely direct application content designers for the game/application, such that the taught subjects and content may be both accurate and provided to the student at an appropriate time during their learning timeline. Further, the length of the various phases may be arranged such that a preparation phase may be at the end of a mental warm-up. Succeeding the preparation may follow 20 participation phases that are long learning sessions. The participation phases may be scored. Then, one preparation phase may be added at the end, which may teach longer-term skills. The preparation phase may not be scored. Succeeding the preparation phase may follow one simulation phase which may add occasional user excitement.

In an illustrative embodiment, the simulation phase avatar may be, for example, a scientist or an engineer, when teaching math. In an illustrative embodiment, the simulation phase avatar may be, for example, an astronaut, or a bridge architect, when teaching physics.

In some embodiments, the MKMATP may lead physical exercise routines. Those skilled in bodybuilding and/or personal exercise may closely direct application content designers for the game/application, such that the content may be both accurate and provided to the user at an appropriate time during their physical training timeline. Further, those skilled in physical therapy may closely direct application content designers in the development of various physical therapy applications. Again, the participation phases and the simulation phases in rapid and repeating successions may keep the user's interest, motivating them to complete their physical therapy exercises as prescribed. In some embodiments, the length of the various phases may be arranged such that a preparation phase may be at the end of a physical warm-up. Succeeding the preparation may follow 20 participation phases that do a relatively long cardiovascular session. The participation phases may be scored. Succeeding the participation phase may follow, one simulation phase allowing the user to occasionally compete and win points against a workout partner, which may add interest or excitement.

In some embodiments, the MKMATP may teach executive functioning skills. Those skilled in executive function may closely direct application content designers for the game/application, such that the taught skills and content may be both accurate and provided to the student at an appropriate time during their learning timeline.

In some embodiments, the MKMATP may teach occupational skills. Those skilled in Occupational Therapy (OT) may closely direct application content designers for the game/application, such that the taught skills and content may be both accurate and provided to the student at an appropriate time during their learning timeline.

Preparation Phase

In some embodiments, the MKMATP may employ a warm-up with an enforcement mechanism to force the user to perform various warm-up activities. The various warm-up activities may provide additional safety against injury from an otherwise cold or stiff-muscled user. After the warm-up activities, the MKMATP may add a preparation phase teaching. In various examples, the preparation phase may not be scored.

Participation Phase

In some examples, users attempting some complex skills may take days or even months of extended preparation before the performance attempt. Further, the actions may also correspond to long-term learning, or preparatory activities. In an illustrative example, a novice dancer may be taught how to execute a quarter-turn, then several days later, a half-turn, and so on until the dancer is prepared to attempt a double-turn. Accordingly, this method may avoid overwhelming the novice dancer. Various types of preparatory activities may be intermixed with the short-term learning activities in the participation phase, so that participants may learn both short-term and long-term skills and/or activities. The short-term activities may directly affect the immediate participation score, whereas the long-term activities may be meant to be part of a slower learning process and may not affect the immediate participation score.

In some examples, a participation phase of an educational video game may be presented to a user. The participation phase may include an in-game instructor presenting skills to be performed by the user. A participation score associated with the user's performance of the skills presented to the user in the participation phase may be determined. In some instances, the participation phase may be referred to as "video training" and may include physical movement by the user. The participation score may be determined based on which actions of a series of actions the user correctly performed at a correct timing sequence, via motion detection software, voice recognition software, and/or the user manually entering data indicating which of the series of actions that the user correctly performed. Further, actions to be performed by an in-game character during a simulation may be determined from the participation score. The determined actions to be performed by the in-game character may include actions and/or skills that may have been presented to the user during the participation phase.

In various examples, the MKMATP may score a user's movements and motivate the user to perform at a higher level based on the results of the simulation. Further, the simulation directly followed by the user's participation in the moves, be they self-defense or dance, for example, may advantageously keep the user engaged in the training activities.

In some examples, the participation score may be embodied in an array. Further, the MKMATP may request the user to perform a series of movements. The MKMATP may score each movement, storing the scores in a memory array. The score then may feed into the simulation phase, again where the simulation may be based on the score. In some embodiments, the movement or series of movements may be required to be executed by the user before the user may move to the simulation phase. In various examples, the participation phase may always be scored.

Simulation Phase

In some examples, the simulation phase may be implemented to generate a simulation of an in-game character or avatar, such that the in-game character's movements during the simulation may be based on the participation score and/or randomized variables. In some embodiments, the in-game character may perform in-game actions based on the instructions presented by the in-game instructor during the participation phase. In some instances, the user may be given a simulation score after the simulation, in response to the participation score and the randomized variables.

In some embodiments, the simulation phase may occur subsequent to the participation phase. Further, the simulation phase may include a simulation of an in-game character performing the skills presented in the participation phase, and skills presented in subsequent participation phases. Accordingly, users may be presented with upcoming skills to learn, in the simulation phase.

The correct or incorrect performance of the in-game character during simulation may be based on the user's participation score and/or randomized variables. In some embodiments, if the user correctly performed actions during the participation phase, the in-game character may correctly perform the actions during the simulation phase. In some embodiments, if the user incorrectly performed actions during the participation phase, the in-game character may incorrectly perform the actions during the simulation phase. The randomized variables may be configured to randomly determine which of the additional skills and/or fictional skills that the in-game character may perform during the simulation phase.

In various examples, during the participation phase the user may be required to perform real world actions which impact the simulation, whereas during the simulation phase the user may be prohibited from performing real world actions. Accordingly, the user may rest during the simulation phase. Further, during the simulation the user may be prohibited from controlling the in-game character. In some embodiments, the simulations may be based on adjusted user participation scores that may be adjusted by randomized variables and/or functions. In some examples, different simulations may occur even if the users obtained the same participation score.

In an illustrative example, the various phases may have their own focus. For example, the participation phase may focus on teaching aspects, and the simulation phase may focus on the entertainment aspects. In some embodiments, the participation phase may be implemented to teach a user a skill. Further, an in-game instructor may present instructions to a user. The user may perform real-world tasks based on the presented instructions. In some embodiments, the user may be given a participation score, in response to how well the user performs the real-world task.

Instruction Avatar

In various embodiments, the instructions presented to the user by the in-game instructor may be associated with at least one skill. For example, the instructions may be associated with a front kick in karate, throwing a ball in baseball, or selecting and mixing chemical components in chemistry.

In some examples, the instructor may be an avatar. The avatar may be a virtual character associated with the skills to be performed. For example, if a user is to perform skills associated with karate the avatar may include a belt corresponding to the user's skill level. If the user is to perform skills associated with surfing, the avatar may include board shorts. If the user is to perform skills associated with cooking, the avatar may include a chef's hat. In various embodiments, a simulated action sequence performed by the avatar may be associated with a user's score.

In some embodiments, an action sequence associated with the instructor avatar may include non-user character elements. For example, in a fight scene, non-user characters may include ninjas, zombies and/or cowboys. The user character may interact with the non-user elements with blocks, kicks and/or punches. In some embodiments, the non-user character elements may be bridges, chemical elements, and/or natural elements (e.g., water, rain).

In some embodiments, the avatar may perform movements associated with a punch, kick, or block. In some embodiments, the avatar may perform movements associated with a series of movements. In some embodiments, the avatar may perform other actions, such as presenting a math lecture.

In various examples, the user may perform real world actions in response to the avatar's request. For example, the user may execute actions (e.g., body movements, pressing buttons, speaking) on the user interface, which may relate to the very next simulation phase. In this case, the actions may correspond to short-term learning activities.

In some examples, the MKMATP may include a user character profile. The profile may include the movements that the user learned, the skill level of the user, and/or a general score. In some instances, the user may receive a score for each move or action.

In an illustrative example, the MKMATP may combine the sophistication of a "moves training application" with the fast-paced action of a conventional video game. Further, game avatars may react to the user motions (e.g., throwing a punch, executing a dance move) in a very tightly coupled manner.

Other Equipment

In some embodiments, the MKMATP may employ various sensors. The sensors may sense user contact/deflection as well as intensity and location. For example, a contact detecting sensor may be adapted to detect an arm block, a leg sweep, leg kicks, elbow impacts, and various martial art offensive/defensive moves. The MKMATP may employ computer vision to determine if the contact detecting sensor has been contacted and/or deflected. Accordingly, the MKMATP may employ automated methods to determine if the user completed an action. Further, the MKMATP may automatically score the user participation.

In some embodiments, the MKMATP may employ a punching bag. Further the punching bag may include sensors to determine parameters such as intensity of impact and/or location of impact. In some implementations, a contact detecting sensor may be a punching stick.

In some embodiments, users may add themselves into the virtual 3D world performing actions, by employment of a video capture method. This method may give users a "feel of the game" by allowing users to generate videos of their actual image (not just an avatar image) performing actions in the video game world. This may add additional user motivation.

Game Topology and Environments

In various examples, the video game server may be configured to transmit information about the state of the virtual space, such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space. The view presented on a given client computing device may correspond to a location in the virtual space (e.g., the location from which the view is taken, the location that the view depicts), or may correspond to a zoom ratio, a dimensionality of objects, a point-of-view, and/or may view various parameters.

In an illustrative example, the instance of the virtual space may include a simulated space that is accessible by users via client computing devices that present the views of the virtual space to a user. The virtual space may have a topography. The virtual space may employ on-going real-time interaction by one or more users. Further, the virtual space may include one or more objects positioned within the topography. In some examples, the objects may be capable of locomotion within the topography.

In some instances, the topography may be a 2-dimensional topography. In some instances, the topography may be a 3-dimensional topography. The topography may include dimensions of the space, and/or surface features of a surface or objects that are "native" to the space. In some instances, the topography may describe a surface (e.g., a ground surface) that may run through at least a substantial portion of the space.

In some examples, views of the virtual space may be selected from a limited set of graphics depicting an event in a given place within the virtual space. The views may include additional content (e.g., text, audio, pre-stored video content) that describes particular elements of the current state of the place. For example, a view may include a generic battle graphic with a textual description of the opponents to be confronted. Other representations of individual places within the virtual space are contemplated.

In an illustrative example, within the instance of a virtual space executed by a video game server, during the participation phase, users may control characters, objects, simulated physical phenomena (e.g., wind, rain, earthquakes), to interact with the virtual space and/or each other. Further, within the instance of the virtual space during the simulation phase, characters, objects, and simulated physical phenomena, may not be controllable by the user. In various examples, regardless of the controllability of the various characters, objects, and simulated physical phenomena, the user may be allowed to control the simulation perspective.

In various examples, the MKMATP may be an educational video game including multiple metrics. Users may be rewarded for their actions, while the educational video game may also advantageously allow novice users to compete with more skilled players.

In an illustrative example, a warm-up type of activity may be enforced by the program to be separate from, and earlier than, the participation phase. Warm-up activities may advantageously result in smoother game play, while resulting in the same type of learning. In some examples, a user warm-up may advantageously provide a higher degree of safety for some vigorous physical activities. In some examples, long-term learning activities may be enforced in the warm-up portion of the application. Further, in some embodiments, applications may stop immediately if the user decides to stop game play.

In some embodiments, the in-game character may perform actions during the simulation, responsive to the randomized participation score. The randomized participation score may adjust what skills the user correctly and/or incorrectly performed during the participation phase, based on a variety of factors. The randomized participation score may also determine whether the in-game character correctly or incorrectly performs the additional skills during the simulation. In some examples, the randomized participation score may not adjust whether the in-game character correctly or incorrectly performs the skills presented during the participation phase. Accordingly, two simulations may be different even if the user achieved the same participation score during the participation phase.

In various examples, the video game server may be a computing device, such as a general hardware platform server configured to support mobile applications or software executed on other client computing devices. The video game server may include physical computing devices residing at a particular location or may be deployed in a cloud computing network environment. In this description, "cloud computing" may be defined as a model for enabling ubiquitous, convenient, on-demand network access to a shared pool of configurable computing resources (e.g., networks, servers, storage, applications, and services) that may be rapidly provisioned via virtualization and released with minimal management effort or service provider interaction, and then scaled accordingly. A cloud model may be composed of various characteristics (e.g., on-demand self-service, broad network access, resource pooling, rapid elasticity, measured service), service models (e.g., Software as a Service ("SaaS"), Platform as a Service ("PaaS"), Infrastructure as a Service ("IaaS")), and deployment models (e.g., private cloud, community cloud, public cloud, hybrid cloud).

In various embodiments, the server may include any combination of one or more computer-usable or computer-readable media. For example, the video game server may include a computer-readable medium including one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, and a magnetic storage device.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user may provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the first receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/ or optical networks, and the computers and networks forming the Internet. Other implementations may transport messages by broadcasting to all or substantially all devices that are coupled together by a communication network, for example, by using Omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Fire wire, ATA/ IDE, RS-232, RS-422, RS-485, 802.11 a/b/g, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

Some aspects of embodiments may be implemented using memory that is not a transitory propagating signal. The memory may be connected to one or more processors and encode data and computer readable instructions, including processor executable program instructions. The data and computer readable instructions may be accessible to the one or more processors. The processor executable program instructions, when executed by the one or more processors, may cause the one or more processors to perform operations.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A kinesthetic training apparatus comprising:
one or more processors; and,
a memory that is not a transitory propagating signal, the memory connected to the one or more processors and encoding data and computer readable instructions, including processor executable program instructions, the data and computer readable instructions accessible to the one or more processors, wherein the processor executable program instructions, when executed by the one or more processors, cause the one or more processors to perform operations comprising:
requesting a user perform specific actions during a participation phase;
assigning one or more scores to the user's performance of the requested specific actions during the participation phase;
generating for display on the display device, during the participation phase, the virtual space including an in-game character or an instructor character performing actions corresponding to the requested specific actions performed by the user during the participation phase; and,
generating for display on a display device, during a simulation phase not being concurrent with the participation phase, a virtual space including the in-game character performing actions corresponding to the requested specific actions performed by the user during the participation phase, wherein the in-game character's skill level in performing actions is based on the one or more scores of the user's performance of the requested specific actions during the participation phase.

2. The kinesthetic training apparatus of claim 1, wherein assigning one or more scores to the user's performance of the requested specific actions during the participation phase comprises detecting the actions of the user during the participation phase via a motion detector device and generating one or more scores based on the detected actions of the user during the participation phase.

3. The kinesthetic training apparatus of claim 1, wherein assigning one or more scores to the user's performance of the requested specific actions during the participation phase comprises receiving user input to define the one or more scores.

4. The kinesthetic training apparatus of claim 1, wherein the in-game character or instructor character performs actions during a participation phase corresponding to the real-world actions performed by the user.

5. The kinesthetic training apparatus of claim 1, wherein the requested specific actions comprise performing a series of martial arts moves.

6. The kinesthetic training apparatus of claim 1, wherein the actions of the in-game character during the simulation phase are determined as a function of the one or more scores and one or more randomized variables.

7. The kinesthetic training apparatus of claim 1, wherein the actions of the in-game character during a simulation phase comprise real time user moves.

8. The kinesthetic training apparatus of claim 1, further comprising a video game server configured to execute the processor executable program instructions for each of a plurality of users.

9. The kinesthetic training apparatus of claim 1, further comprising a contact detecting member having sensors operable to determine whether the contact detecting member has been contacted by the user.

10. A kinesthetic training apparatus comprising:
one or more processors; and,
a memory that is not a transitory propagating signal, the memory connected to the one or more processors and encoding data and computer readable instructions, including processor executable program instructions, the data and computer readable instructions accessible to the one or more processors, wherein the processor executable program instructions, when executed by the one or more processors, cause the one or more processors to perform operations comprising:
requesting a user perform specific actions during a participation phase;
assigning one or more scores to the user's performance of the requested specific actions during the participation phase; and,
generating for display on a display device, during a simulation phase not being concurrent with the participation phase, a virtual space including an in-game character performing actions corresponding to the requested specific actions performed by the user during the participation phase, wherein the in-game character's skill level in performing actions is based on the one or more scores of the user's performance of the requested specific actions during the participation phase.

11. The kinesthetic training apparatus of claim 10, wherein assigning one or more scores to the user's performance of the requested specific actions during the participation phase comprises detecting the actions of the user during the participation phase via a motion detector device and generating one or more scores based on the detected actions of the user during the participation phase.

12. The kinesthetic training apparatus of claim 10, wherein assigning one or more scores to the user's performance of the requested specific actions during the participation phase comprises receiving user input to define the one or more scores.

13. The kinesthetic training apparatus of claim 10, wherein the operations further comprise generating for display on the display device, during the participation phase, the virtual space including the in-game character or an instructor character performing actions corresponding to the requested specific actions performed by the user during the participation phase.

14. The kinesthetic training apparatus of claim 13, wherein the in-game character or instructor character performs actions during a participation phase corresponding to the real-world actions performed by the user.

15. The kinesthetic training apparatus of claim 10, wherein the actions of the in-game character during the simulation phase are determined as a function of the one or more scores and one or more randomized variables.

16. The kinesthetic training apparatus of claim 10, wherein the actions of the in-game character during a simulation phase comprise real time user moves.

17. The kinesthetic training apparatus of claim 10, further comprising a contact detecting member having sensors operable to determine whether the contact detecting member has been contacted by the user.

18. A method for kinesthetic training comprising:
providing one or more processors; and,
providing a memory that is not a transitory propagating signal, the memory connected to the one or more processors and encoding data and computer readable instructions, including processor executable program instructions, the data and computer readable instructions accessible to the one or more processors, wherein the processor executable program instructions, when executed by the one or more processors, cause the one or more processors to perform operations comprising:

requesting a user perform specific actions during a participation phase;

assigning one or more scores to the user's performance of the requested specific actions during the participation phase;

generating for display on a display device, during a simulation phase not being concurrent with the participation phase, a virtual space including an in-game character performing actions corresponding to the requested specific actions performed by the user during the participation phase, wherein the in-game character's skill level in performing actions is based on the one or more scores of the user's performance of the requested specific actions during the participation phase.

19. The method for kinesthetic training of claim 18, wherein assigning one or more scores to the user's performance of the requested specific actions during the participation phase comprises detecting the actions of the user during the participation phase via a motion detector device and generating one or more scores based on the detected actions of the user during the participation phase.

20. The method for kinesthetic training of claim 18, further comprising providing for a contact detecting member having sensors operable to determine whether the contact detecting member has been contacted by the user.

* * * * *